(12) United States Patent
Baudoin et al.

(10) Patent No.: US 7,457,268 B2
(45) Date of Patent: Nov. 25, 2008

(54) SCHEME FOR PACKET ALLOCATION IN A RADIOCOMMUNICATION SYSTEM

(75) Inventors: Cédric Baudoin, Toulouse (FR); Jacques Bousquet, Croissy sur Seine (FR); Guillaume Calot, Versailles (FR); Cédric Lapaille, Chatou (FR)

(73) Assignee: Alcatel, Paris (FR)

( * ) Notice: Subject to any disclaimer, the term of this patent is extended or adjusted under 35 U.S.C. 154(b) by 646 days.

(21) Appl. No.: 10/985,060

(22) Filed: Nov. 10, 2004

(65) Prior Publication Data

US 2005/0135414 A1 Jun. 23, 2005

Related U.S. Application Data

(63) Continuation of application No. 09/373,713, filed on Aug. 13, 1999, now abandoned.

(30) Foreign Application Priority Data

Jul. 6, 1999 (EP) .................... 99401686

(51) Int. Cl.
  *H04B 7/216* (2006.01)
  *H04B 7/212* (2006.01)
  *H04J 3/00* (2006.01)
(52) U.S. Cl. ............... 370/335; 370/336; 370/342; 370/347
(58) Field of Classification Search .......... 370/320, 370/335, 342, 336, 337, 345, 347, 441, 442
See application file for complete search history.

(56) References Cited

U.S. PATENT DOCUMENTS

| 5,210,771 | A | * | 5/1993 | Schaeffer et al. ............ 375/132 |
| 5,295,153 | A | | 3/1994 | Gudmundson |
| 5,579,306 | A | * | 11/1996 | Dent .......................... 370/330 |
| 5,604,743 | A | | 2/1997 | Le Guigner et al. |
| 5,621,723 | A | | 4/1997 | Walton et al. |
| 5,742,612 | A | | 4/1998 | Gourgue et al. |
| 5,761,197 | A | | 6/1998 | Takefman |
| 5,905,962 | A | | 5/1999 | Richardson |
| 6,072,784 | A | | 6/2000 | Agrawal et al. |
| 6,072,788 | A | * | 6/2000 | Peterson et al. ............. 370/337 |
| 6,078,576 | A | * | 6/2000 | Schilling et al. ............ 370/347 |
| 6,259,685 | B1 | * | 7/2001 | Rinne et al. ................. 370/330 |

(Continued)

FOREIGN PATENT DOCUMENTS

EP 631 397 A2 12/1994

(Continued)

OTHER PUBLICATIONS

Benard Sklar, "Digital Communications Fundamentals and Applications", 1988, P T R Prentice-Hall, pp. 357-362.*

(Continued)

*Primary Examiner*—Firmin Backer
*Assistant Examiner*—Nittaya Juntima
(74) *Attorney, Agent, or Firm*—Sughrue Mion, PLLC

(57) ABSTRACT

The invention relates to a method for the allocation of packets on a carrier containing timeslots, comprising the step of defining an interleaving length and an allocation window characterized in that packets are allocated within groups defined by the power needed for the transmission and that the size of groups is at most equal to the interleaving length.

11 Claims, 3 Drawing Sheets

U.S. PATENT DOCUMENTS 6,285,665 B1    9/2001    Chuah
6,320,854 B1    11/2001    Farber et al.
6,330,429 B1    12/2001    He
6,535,503 B1 *    3/2003    Toskala et al. .............. 370/349

FOREIGN PATENT DOCUMENTS

EP          926 905 A1    6/1999
WO       WO 98 17 077 A2    4/1998
WO       WO 98 27 747 A2    6/1998
WO       WO 98 44754 A2    10/1998

OTHER PUBLICATIONS

Near-far Effects in Adaptive SDMA Systems, M. Tangemann, Sixth IEEE International Symposium on Personal, Indoor and Mobile Radio Communications, vol. 3, Sep. 27-29, 1995, pp. 1293-1297.

* cited by examiner

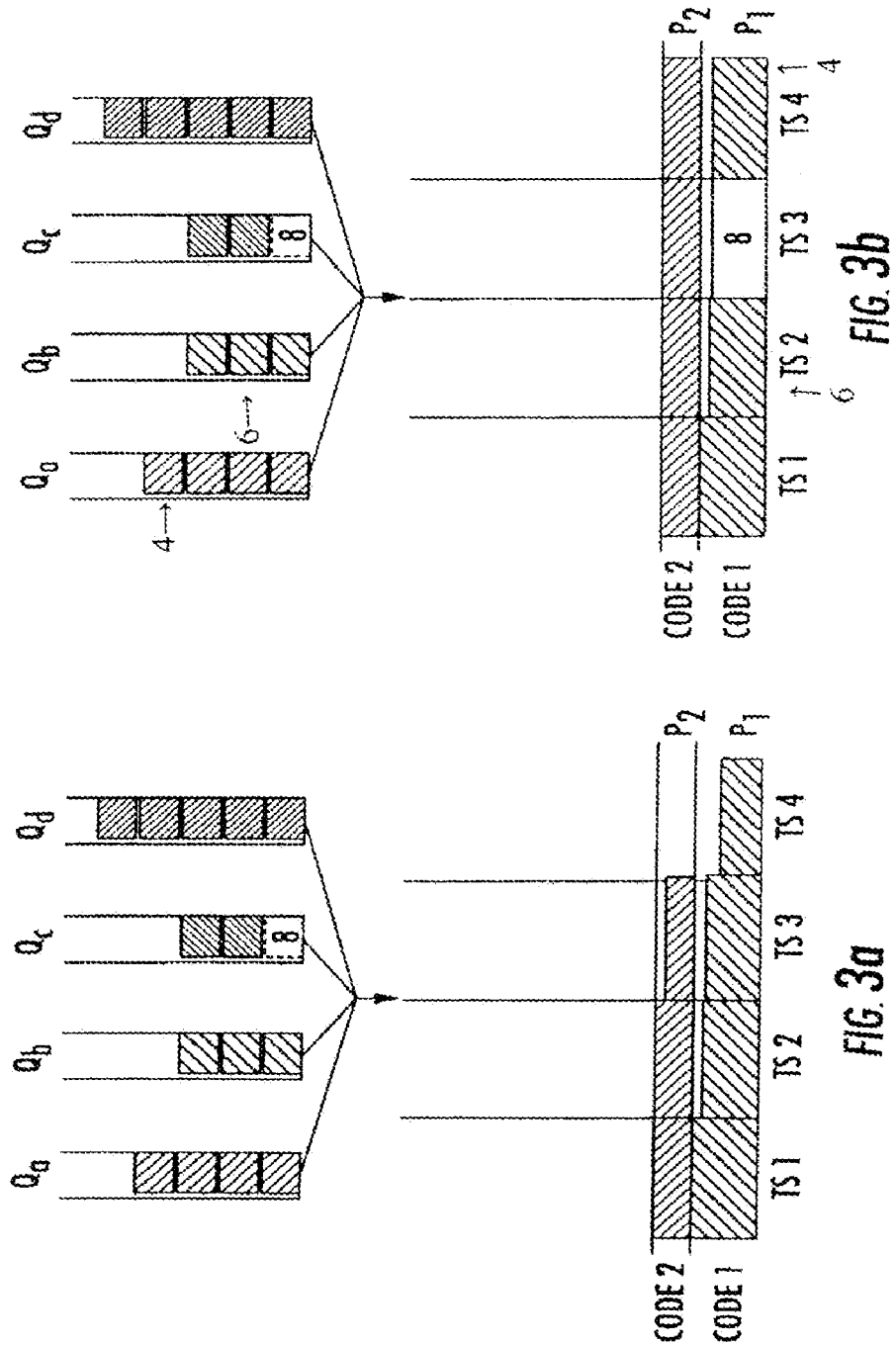

SCHEME FOR PACKET ALLOCATION IN A RADIOCOMMUNICATION SYSTEM

This is a continuation of U.S. application Ser. No. 09/373,713, filed Aug. 13, 1999 now abandoned.

BACKGROUND OF THE INVENTION

The invention relates to telecommunications systems using packet transmission and radiocommunication transfer. More particularly, it is related to a method for allocating packets coming from a packet transmission within a limited timeslot in a radiocommunication system.

In transmission systems that aim at offering interactive services, it is crucial to define a service quality required for the communication. Since these services are linked with the time response of all the systems, the time delays have to be optimized to ensure this service quality. It is known that there is no perception of time delay when system response times are below a limit defined by the type of service required. For example, phone communications have a limit of about 400 ms whereas medical remote systems have a limit of 5 ms. The time delay due to the system itself is then crucial.

In telecommunication and radiocommunication systems, the Bit Error Rate (BER) measuring the quality of the transmission, can be improved by using an error correcting code. In a packet (or cell) transmission, this correcting code can be used in two ways: an individual packet coding or a group coding with packet interleaving. The interleaving method allows reducing the Signal to Noise Ratio (SNR) threshold necessary for reaching the requested BER. Meanwhile, this method has to wait for the whole interleaved packet group in order to decode it.

In U.S. Pat. No. 5,231,633, a queueing and dequeueing mechanism for use in an integrated fast packet network, wherein fast packets from differing traffic types are multiplexed with one another through use of a weighted round-robin bandwidth allocation mechanism. Fast packets within a particular traffic type are selected for transmission through use of a head of line priority service (514), a packet discard mechanism, or both. The weighted round-robin bandwidth allocation mechanism functions, in part, based upon a credit counter for each queue group that represents a particular traffic type.

In U.S. Pat. No. 5,905,730, a packet scheduler is disclosed which provides a high degree of fairness in scheduling packets associated with different sessions. The scheduler also minimizes packet delay for packet transmission from a plurality of sessions which may have different requirements and may operate at different transfer rates. When a packet is received by the scheduler, the packet is assigned its own packet virtual start time based on whether the session has any pending packets and the values of the virtual finish time of the previous packet in the session and the packets arrival time. The scheduler then determines a virtual finish time of the packet by determining the transfer time required for the packet based upon its length and rate and by adding the transfer time to the packet virtual start time of the packet. The packet with the smallest virtual finish time is then scheduled for transfer. By selecting packets for transmission in the above described manner, the available bandwidth may be shared in pro-rata proportion to the guaranteed session rate, thereby providing a scheduler with a high degree of fairness while also minimizing the amount of time a packet waits in the scheduler before being served.

In U.S. Pat. No. 5,917,822, a method in accordance with the invention allocates bandwidth, fairly and dynamically, in a shared-media packet switched network to accommodate both elastic and inelastic applications. The method, executed by or in a head-end controller, allocates bandwidth transmission slots, converting requests for bandwidth into virtual scheduling times for granting access to the shared media. The method can use a weighted fair queuing algorithm or a virtual clock algorithm to generate a sequence of upstream slot/transmission assignment grants. The method supports multiple quality of service (QoS) classes via mechanisms which give highest priority to the service class with the most stringent QoS requirements.

These systems allow faster packet transmission, with a quality of service, but do not take into consideration the terminal characteristics. They are not fit to a telecommunication system that has a limited power ability, which is one of the problems solved by the invention.

In a Code Division Multiple Access (CDMA), Time Division Multiple Access (TDMA) or frequency division Multiple Access (FDMA) system using packet transmission, e.g. Asynchronous Transfer Mode (ATM), the communication with a terminal can be sporadic. The power necessary to enable the transmission to the terminal is adjusted following the propagation conditions. These accesses lead to a statistical multiplexing in passband and in power that is controlled by the filling algorithm. The interleaving coding may cause a rise of the time transfer of packets in a given terminal, which is not acceptable if a good service quality is required.

Resource allocation may be difficult with interleaving coding for the following reasons:
  Service quality is required, especially for packet transfer;
  Power is identical for the packets belonging to the same group;
  The system should optimize its power and band consumption and avoid complementary or stuffing packets;

In order to solve these problems, it is possible to use packet interleaving in a mono- or multi-terminal, a priori or a posteriori packet choice, fixed or variable position in the interleaved packets frame or appropriate carrier filling algorithm.

The first way to define the classes is based on the a priori knowledge of the emission power for each terminal, independently of the allocation process. At the end of the allocation, packets are interleaved in clusters with the same length as the interleaving.

The second way builds the classes after the allocation process, which correspond to an optimal a posteriori class definition. The loss due to power classes is minimized. An additional loss may also occur when the number of allocated packets is not a multiple of the interleaving length.

It is known that a mono-terminal requires a sufficient number of transmitted packets for an efficient coding in a limited time. The two methods can be combined, depending on the number of packets to be coded. The default method is the interleaving, except when the number of packets is too low. In that case another coding method is used. This solution is not really efficient and needs two decoders in the terminal.

SUMMARY OF THE INVENTION

The invention is related to a method for the allocation of packets on a carrier containing timeslots, comprising the step of defining an interleaving length and an allocation window characterized in that packets are allocated within groups defined by the power needed for the transmission and that the size of groups is at most equal to the interleaving length.

During the allocation process, packets can come from different terminals.

Packets are sorted following their power during the allocation and they are spread in groups following their sorting order in order to minimize the power loss in groups. The sorting algorithm can minimize the global power loss during the allocation.

In a preferred embodiment, packets are interleaved in at least one group.

This method can be used in a TDMA system, a CDMA system or a FDMA system.

The invention also relates to a packet transmission receiver, e.g. an ATM receiver, containing storage means and computing means for using this method.

The invention is related to multi-terminals using a power class clustering. The power classes enables a packet interleaving with clustering of the packets having a close emission power. Since the interleaved packets are transmitted with the lowest available power terminal, the loss of power due to the packet grouping is minimized.

BRIEF DESCRIPTION OF THE DRAWING

The invention will be more clearly understood from the following description in conjunction with the accompanying drawings, wherein:

FIG. 3 illustrates the filling operation performed by the carrier load algorithm of FIG. 2.

DETAILED DESCRIPTION OF THE INVENTION

Figure 1:
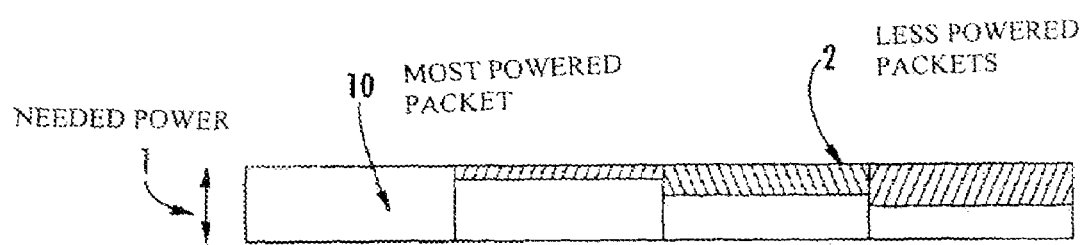
FIG. 1 is a diagram illustrating the interleaving of packets.

FIG. 1 shows four packets interleaving. The needed power (1) for the transmission corresponds to the most powered packet (10). The other packets are less powered and therefore lose some of the emission powered (2). The goal of the invention is to find packets with power close enough to minimize this loss.

Figure 2:
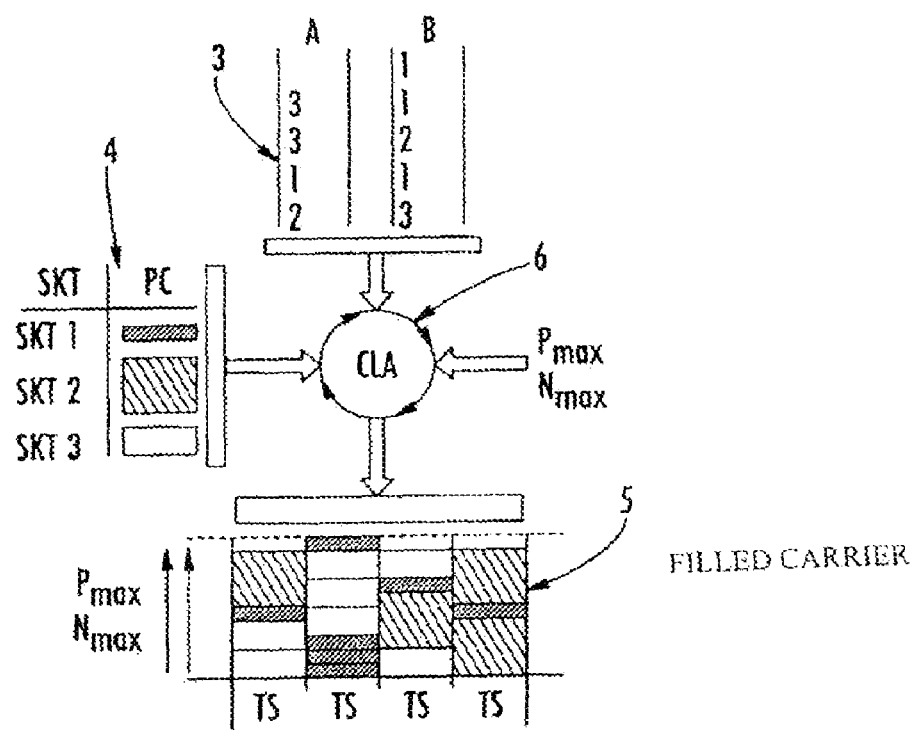
FIG. 2 illustrates the operation of a Carrier Load Algorithm for determining how the packets are to be distributed in accordance with the present invention.

FIG. 2 shows the general scheme of the Carrier Load Algorithm (CLA)(6). Different packets come in a random order (3). They are recognized following their Skybridge™ Terminal (SKT) and their power (4). The CLA also requires two variables that define the service quality. The first one in well known as the bandwith (Nmax), which gives the number of packets allowable in one Timeslot (TS). The second one gives the power rules defined to avoid interference with other systems. This corresponds to a variable Pmax. The CLA has to fill the carrier with respect to these two limits, as in (5).

FIG. 3 shows the filling algorithm itself. The first seven packets are already put on the carrier on FIG. 3a. The next step consists in putting packet number eight between packets six and four, following the decreasing power order (FIG. 3b).

The invention consists in filling the carrier by grouping packets with close power and allowing an interleaving coding. Each group corresponds to a power class and its number of packets is the same as the interleaving length.

In a preferred embodiment, a specific algorithm uses this method in order to fill the carrier the most efficiently way.

As they are received, the ATM packets are sorted in four queues on the basis of the quality of the associated connection. These queues contain packets from all terminals assigned to the carrier.

In this embodiment, the algorithm has an allocation cycle of four timeslots and it does the allocation with respect to The global number of available codes;

The global power available for filling the carrier;

The power differences between codes of the same timeslot. If these powers are too different, the lowest powered codes can be lost because of the noise of the highest ones.

At each stage, the algorithm begins by selecting the packets that need the most important service quality, then spreads them progressively on the first timeslots available in the allocation window while sorting them by decreasing power.

The first code of the first timeslot therefore contains the most powered packet. When the algorithm decides to put the packet in carrier, it looks for the code and the timeslot when it can be inserted. If the insertion is possible, all the less powered packets are shifted.

At the end of the allocation process, the power classes correspond to the power needed to transmit the packets on the four timeslots on one code. The power class construction is therefore made dynamically in the allocation process.

This scheme can be applied to any kind of queuing, e.g. Weighted Fair Queuing, since it only organizes the way packets are put on the carrier, independently from the transfer mode. This method is a complementary process between a scheduler and a telecommunication mode.

In four packets interleaving, it has been measured that the SNR necessary to ensure a predetermined packet loss rate is lowered by 1 dB compared to a mono-packet coding. Conversely, there is a loss due to the clustering that is estimated at 0.3 dB, which leads to a global gain of 0.7 dB in the system.

The invention claimed is:

1. A method for the allocation of packets on a carrier containing a plurality of timeslots, comprising:

defining an allocation window for the determination of a subpart of said plurality of the timeslots to be considered during one allocation cycle, grouping packets from said subpart within respective groups, each group being defined by a respective transmission power, wherein said defining the allocation window includes defining an interleaving length corresponding to the number of packets that are interleaved using interleaving coding which is destined to process each group, the interleaving coding comprising applying a specific code to a respective group and wherein the size of said groups is at most equal to the interleaving length, each group being updated at each allocation cycle as a function of a power needed for transmission of the packets which the group currently contains.

2. The method for allocation of packets on a carrier containing timeslots as claimed in claim 1, wherein the packets originate from different terminals.

3. The method for allocation of packets on a carrier containing timeslots as claimed in claim 1, wherein the packets are sorted as a function of power of a packet during the allocation, and the packets are spread in groups following the sorting order of the packets in order to minimize power loss in a group.

4. The method for allocation of packets on a carrier containing timeslots as claimed in claim 3, wherein the sorting minimizes global power loss during the allocation.

5. The method for allocation of packets on a carrier containing timeslots as claimed in claim 1, wherein the packets are interleaved in at least one group.

6. The method for allocation of packets on a carrier containing timeslots according to claim 1, wherein said method is implemented in a TDMA system.

7. The method for allocation of packets on a carrier containing timeslots according to claim 1, wherein said method is implemented in a CDMA system.

8. The method for allocation of packets on a carrier containing timeslots according to claim 1, wherein said method is implemented in a FDMA system.

9. An Asynchronous Transfer Mode (ATM) receiver for receiving packets, said receiver comprising:
   storage means for storing an algorithm comprising:
   defining an allocation window for the determination of a subpart of said plurality of the timeslots to be considered during one allocation cycle,
   grouping packets from said subpart within respective groups, each group being defined by a respective transmission power,
   wherein said defining the allocation window includes defining an interleaving length corresponding to the number of packets that are interleaved using interleaving coding which is destined to process each group, the interleaving coding comprising applying a specific code to a respective group and wherein the size of said groups is at most equal to the interleaving length, each group being updated at each allocation cycle as a function of a power needed for transmission of the packets which the group currently contains; and
   computing means for executing said algorithm.

10. The method for allocation of packets on a carrier containing timeslots as claimed in claim 2, wherein the packets are sorted as a function of power of a packet during the allocation, and
   the packets are spread in groups following the sorting order of the packets in order to minimize power loss in a group.

11. An Asynchronous Transfer Mode (ATM) receiver for receiving packets, said receiver comprising:
   means for defining an allocation window for the determination of a subpart of said plurality of the timeslots to be considered during one allocation cycle, and
   means for grouping packets from said subpart within respective groups, each group being defined by a respective transmission power,
   wherein said defining the allocation window includes defining an interleaving length corresponding to the number of packets that are interleaved using interleaving coding which is destined to process each group, the interleaving coding comprising applying a specific code to a respective group and wherein the size of said groups is at most equal to the interleaving length, each group being updated at each allocation cycle as a function of a power needed for transmission of the packets which the group currently contains.

\* \* \* \* \*